US008819132B2

(12) United States Patent
Serr et al.

(10) Patent No.: US 8,819,132 B2
(45) Date of Patent: Aug. 26, 2014

(54) REAL-TIME DIRECTORY GROUPS

(75) Inventors: Robert W. Serr, Kirkland, WA (US);
Mark D. McClelland, Seattle, WA (US);
Scott A. Huddleston, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 530 days.

(21) Appl. No.: 12/472,883

(22) Filed: May 27, 2009

(65) Prior Publication Data
US 2010/0306317 A1 Dec. 2, 2010

(51) Int. Cl.
*G06F 15/16* (2006.01)

(52) U.S. Cl.
USPC ............ 709/204; 709/205; 709/206; 709/207

(58) Field of Classification Search
CPC ...... G06Q 10/10; G06Q 10/107; H04L 29/06; H04L 29/0872
USPC .................................................. 709/204–207
See application file for complete search history.

(56) References Cited

U.S. PATENT DOCUMENTS

| 6,487,583 | B1 * | 11/2002 | Harvey et al. ................ 709/204 |
| 6,871,213 | B1 * | 3/2005 | Graham et al. ............... 709/205 |
| 7,346,658 | B2 * | 3/2008 | Simpson ....................... 709/205 |
| 7,346,696 | B2 | 3/2008 | Malik |
| 7,730,129 | B2 * | 6/2010 | Wang et al. ................... 709/204 |
| 8,260,857 | B2 * | 9/2012 | Manion et al. ................ 709/205 |
| 2001/0051982 | A1 * | 12/2001 | Graziani ....................... 709/204 |
| 2002/0023132 | A1 * | 2/2002 | Tornabene et al. ........... 709/205 |
| 2002/0073151 | A1 * | 6/2002 | Rogers et al. ................. 709/204 |
| 2002/0087649 | A1 * | 7/2002 | Horvitz ......................... 709/207 |
| 2002/0143876 | A1 * | 10/2002 | Boyer et al. .................. 709/205 |
| 2002/0152271 | A1 * | 10/2002 | Chafle et al. ................. 709/204 |
| 2003/0001890 | A1 * | 1/2003 | Brin .............................. 345/753 |
| 2003/0050986 | A1 * | 3/2003 | Matthews et al. ............ 709/206 |
| 2003/0078972 | A1 * | 4/2003 | Tapissier et al. ............. 709/204 |
| 2003/0163547 | A1 * | 8/2003 | Beisty et al. ................. 709/217 |
| 2004/0039779 | A1 * | 2/2004 | Amstrong et al. ........... 709/204 |
| 2005/0004984 | A1 * | 1/2005 | Simpson ....................... 709/205 |
| 2005/0027802 | A1 | 2/2005 | Madsen et al. |
| 2005/0102356 | A1 * | 5/2005 | Manion et al. ................ 709/204 |
| 2005/0132012 | A1 * | 6/2005 | Muller et al. ................. 709/206 |
| 2005/0251555 | A1 * | 11/2005 | Little ............................ 709/206 |

(Continued)

OTHER PUBLICATIONS

Strom, David, "Group Chat Evolving Into E-Mail 2.0", Retrieved at <<http://businessinnovation.cmp.com/articles/res_archit_061211.jhtml>>, Dec. 7, 2006, pp. 1-3.
"Aditi", "MindAlign", Retrieved at <<http://www.aditi.com/enterprise_products_mindalign.html>>, Mar. 26, 2009, pp. 1-2.

(Continued)

*Primary Examiner* — Jimmy H Tran

(74) *Attorney, Agent, or Firm* — Andrew Smith; Jim Ross; Micky Minhas

(57) ABSTRACT

Groups within an organizational directory are set up as real-time groups enabling subscribers of those groups to receive incoming content via feeds or to interact with the group through real-time chat sessions. Subscribers are enabled to switch between interaction modes, employ different real-time communication modalities for chat sessions, and access stored records of incoming content, discussions, and similar data.

19 Claims, 7 Drawing Sheets

(56) References Cited

U.S. PATENT DOCUMENTS

| | | | |
|---|---|---|---|
| 2006/0031234 | A1 | 2/2006 | Beartusk et al. |
| 2006/0095514 | A1* | 5/2006 | Wang et al. ............ 709/204 |
| 2007/0005754 | A1* | 1/2007 | Horvitz et al. ......... 709/224 |
| 2007/0162547 | A1* | 7/2007 | Ross ...................... 709/204 |
| 2008/0034040 | A1* | 2/2008 | Wherry et al. ......... 709/204 |
| 2008/0114835 | A1* | 5/2008 | Mu et al. ............... 709/204 |
| 2008/0168138 | A1* | 7/2008 | Simpson ................ 709/204 |
| 2008/0183814 | A1 | 7/2008 | Sanghavi |
| 2008/0270555 | A1* | 10/2008 | Reynolds et al. ...... 709/206 |
| 2009/0019367 | A1* | 1/2009 | Cavagnari et al. ..... 715/716 |

OTHER PUBLICATIONS

"Enterprise Knowledge Software—PeerAware Group Chat", Retrieved at <<http://www.peeraware.com/>>, Mar. 26, 2009, p. 1.

"Akeni Enterprise Instant Messaging LDAP 2.2.96 (Windows)", Retrieved at <<http://software.techrepublic.com.com/abstract.aspx?docid=546089>>, Mar. 26, 2009, pp. 1-2.

"Team Collaboration with Real Time Chat", Retrieved at <<http://campfirenow.com/>>, Mar. 26, 2009, pp. 1-4.

"Bespoke Utility Bots", Retrieved at <<http://www.formicary.net/site/docs/download/Formicary_Bespoke_Utility_Bots%20Final.pdf?id=199421>>, pp. 19, 2007.

* cited by examiner

REAL-TIME DIRECTORY GROUPS

BACKGROUND

Electronic mail (or email) and its more recent derivative text messaging have become an integral part of people's daily personal and professional lives. Serving as a communication mode between letters and phone calls, emails are widely used for all kinds of communication purposes. One of the useful features of email is that it can be addressed to multiple recipients at the same time and a chain of email exchanges can be preserved in each message. On the other hand, the same features may also result in an overload of communication simply by their number and size.

Email centric organizations tend to communicate very heavily in email. Many of these organizations rely on "Distribution Lists", or groups of people in a directory, as a recipient of their emails. This may cause a large amount of email traffic to and from these groups. Since all of this traffic is delivered to a user's inbox, this may result in overwhelming the user through an extraordinary amount of emails in their inbox.

Modern communication systems have a large number of capabilities including integration of various communication modalities with different services. For example, instant messaging, voice/video communications, data/application sharing, white-boarding, and other forms of communication may be employed to facilitate communications between groups of users providing paths for exchanging information in addition to email.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to creating a setting for groups within an organizational directory that enables groups of users to be "real-time" groups. Users who are part of such groups are enabled to select different ways to interact with their groups including, but not limited to subscribing to feeds from the group to be notified of incoming content to the group, real-time interaction with the group through a chat room, and similar methods.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
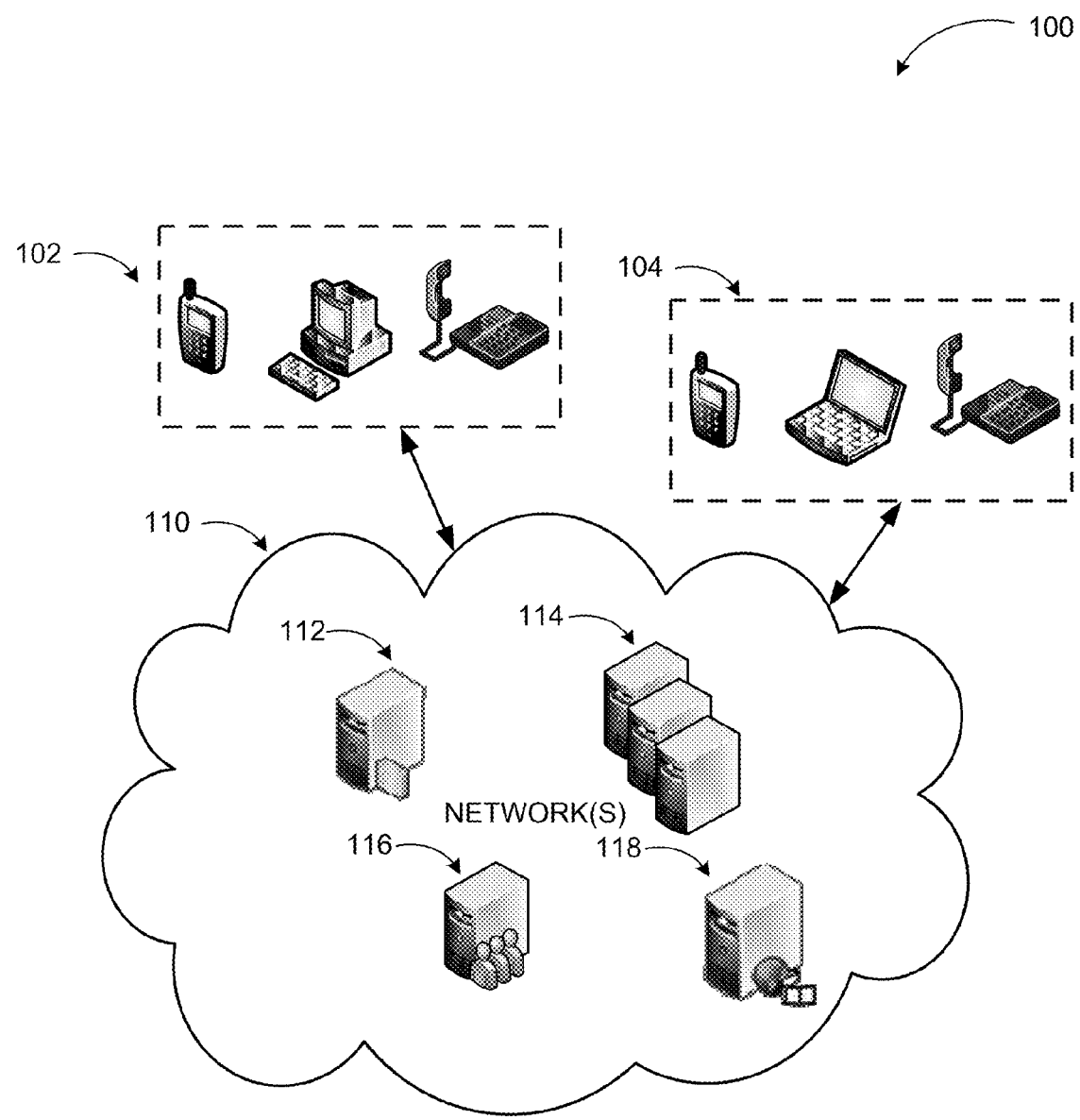
FIG. 1 is a diagram illustrating an example unified communications system, where embodiments may be implemented for real-time directory groups.

As briefly described above, users may be enabled to subscribe to and interact with real-time directory groups, where they can receive information on incoming content via feeds, interact through real-time chat sessions, and access history of discussions without having to receive voluminous emails or text messages from a large number of other users. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, audio-video conferencing, web conferencing functionality, and comparable capabilities.

Discussions between subscribers of a communication system such as the UC system of diagram 100 may be initiated by one of the subscribers or by a communication from an external user. The discussion may center around a subject matter associated with particular content such as a document, a video file, an audio file, or any other type of content. As discussed above, traditional email-centric systems may generate a large number of emails back and forth between the subscribers with each email potentially containing within itself the chain of previous emails and potentially being sent to a number of subscribers. A multimodal communication capable system according to embodiments enables facilitation of conversations between subscribers, which may include different modes of communication at any given time and also maintain other records (e.g. stored documents, links, recordings) associated with the conversation.

A conversation as used herein refers to a multimodal communication session, where subscribers may communicate over a plurality of devices, applications, and communication modes simultaneously or sequentially. For example, two subscribers may initiate a conversation by exchanging instant messages through their desktop computers. Later, the communication may be elevated to audio and instant message with one subscriber utilizing their desktop for both modes, while the other uses the desktop computer for instant messaging and a smart phone device for the audio mode. The commonality between these communications is preserved by designating all these communications as belonging to the same conversation. Each conversation may be assigned an identifier, which enables subscribers to view, record, modify, share, and generally manage aspects of the conversation including documents and other data associated with the conversation (e.g. documents exchanged as attachments in one mode of the conversation or recordings of other modes of the conversation).

To optimize conversations centered around a particular topic, subscribers in a system according to embodiments may become part of real-time directory groups. Such groups may be managed by dedicated servers like group management server 116 or by other multi-purpose servers of the system and enable subscribers to select their mode of interaction with others in the group at different times. A less traffic generating mode such as a feed or email notification may be utilized to notify the subscribers about new content associated with the group. The subscribers may then decide to change to a more active interaction mode like a chat session. In a conventional system, an email discussion, for example, may generate a large number of exchanged messages as emails, responses, and responses to responses are sent back and forth among the list of recipients. In a system according to embodiments, a subscriber can opt out of receiving any messages on a particular topic after receiving the feed about the topic being received by the group as new content. If the subscriber decides to participate, their participation is in chat format, thus avoiding unnecessarily large traffic the whole group.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers.

UC Network(s) 110 includes a number of servers performing different tasks. For example, UC servers 114 provide registration, presence, and routing functionalities. Presence functionality enables the system to route calls to a user to anyone of the client devices assigned to the user based on default and/or user set policies. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. As mentioned above, group management server 116 manages real-time groups and subscribers' interactions with those groups.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

One of the interaction modes mentioned above for real-time directory groups is a feed. Feeds have become common with the proliferation of network communications, especially via the Internet. A commonly used feed mechanism is Really Simple Syndication (RSS) feed. RSS feed is a family of web feed formats used to publish frequently updated works—such as blog entries, news headlines, audio, and video—in a standardized format. An RSS document (also called a "feed", "web feed", or "channel") includes full or summarized text, plus metadata such as publishing dates and authorship. Web feeds benefit users who want to subscribe to timely updates from favored websites, groups, or to aggregate feeds from many sites into one place. RSS feeds are typically read using software called an RSS reader, a feed reader, or an aggregator, which can be web-based, desktop-based, or mobile-device-based. A standardized Extensible Markup Language (XML) file format allows the information to be published once and viewed by many different programs. The user subscribes to a feed by entering the feed's URI or URL into their feed reader or by clicking an RSS icon in a browser that initiates the subscription process. The RSS reader checks the user's subscribed feeds regularly for new content, downloads any updates that it finds, and provides a user interface to monitor and read the feeds.

While the example system in FIG. 1 has been described with specific components such as mediation server, A/V server, and similar devices, embodiments are not limited to this system of the example components and configurations. An enhanced communication system facilitating interactions with real-time directory groups may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
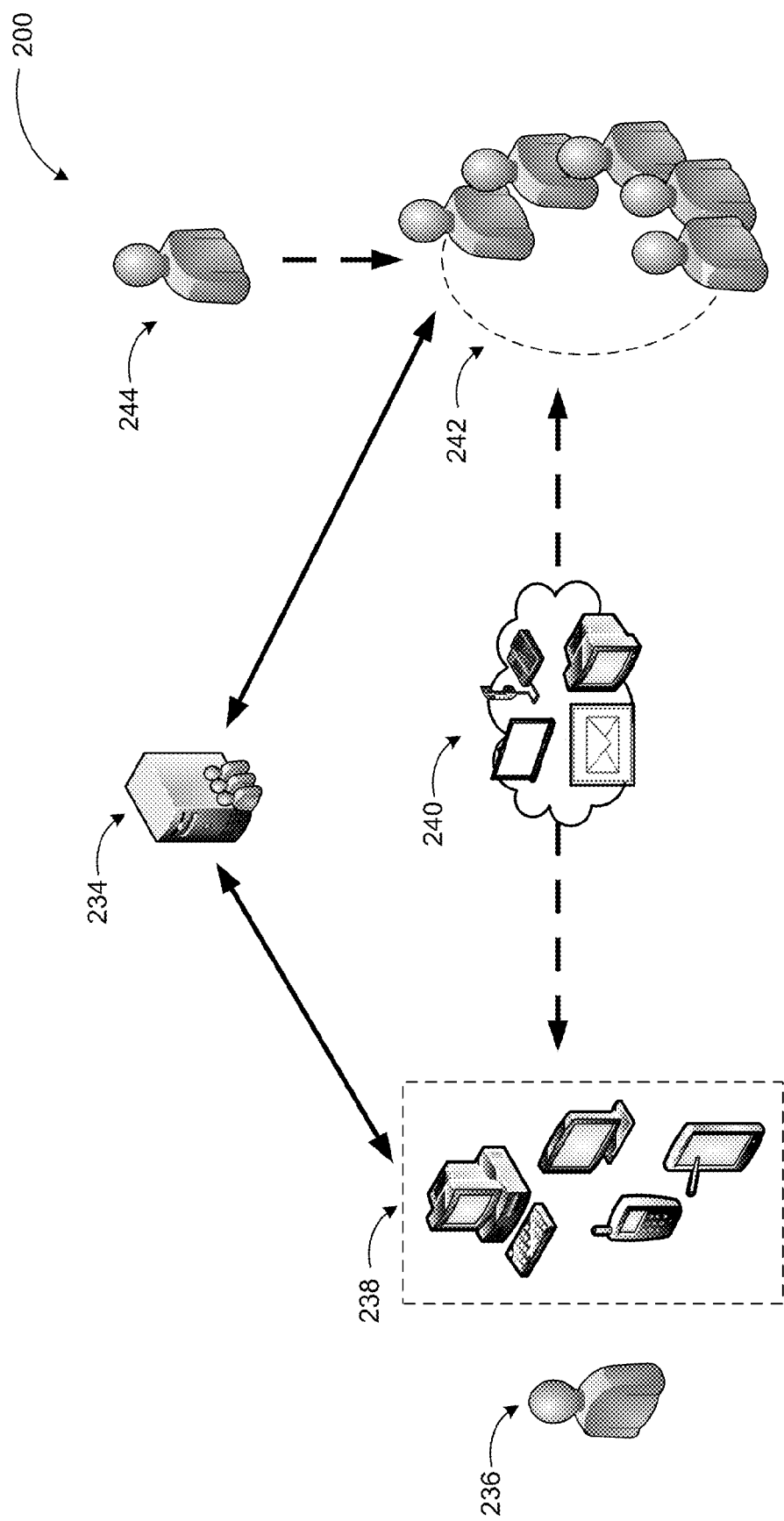
FIG. 2 is a conceptual diagram illustrating a basic example system for exchanging information with a real-time directory group according to embodiments.

FIG. 2 is a conceptual diagram illustrating a basic example system for exchanging information with a real-time directory group according to embodiments. While a system according to embodiments is likely to include a number of servers, client devices, and services such as those illustratively discussed in FIG. 1, only those relevant to embodiments are shown in diagram 200 of FIG. 2.

In the example enhanced communication system of diagram 200, real-time directory group 242 may include a number of subscribers focused on a common theme (e.g. technical assistance group, design group, human resources group, book discussion group, etc.). The group may receive new content such as a message, a document, an audio file, a video file, or similar content from one of its subscribers or from an external source like user 244.

User 236 may be a subscriber of the real-time directory group 242 and interact with the group employing a number of communication modes 240 such as audio, video, file sharing, desktop sharing, instant messaging, electronic mail, white board sharing, and similar forms of communication. User 236 may accomplish this through end devices 238.

Real-time directory group 242 may be managed by group management server 234. Group management server 234 may facilitate interactions with the group over various communication modes, aggregate and transmit feeds or similar notifications, manage storage of records and documents associated with the discussions (conversations) within the group. The server may even make various groups available to members of an organizational directory and enable users to create their own real-time groups.

According to an example scenario, a user creates a group 242 in the enterprise directory and configures this as a real-time group. User 236 subscribes to the group 242. At subscription time, user 236 is asked how he wants to be notified of incoming content to the group. Options are email, RSS feed, and participating in group chat. User 236 selects RSS feed. During the day, User 236 receives an RSS update for new content received by the group. User 236 decides that this is an important topic and wants to respond immediately. User 236 clicks on the group and selects an option to communicate in real-time in his communication application user interface. This action takes user 236 to a chat room representing the group 242. Contextual history of the original message that has been posted to the group 242 may be displayed as history in the chat room. User 236 can see others who are currently communicating with this group in real-time. User 236 responds to the group 242. Once user 236 is satisfied with the conversation, he leaves the chat room. User 236 is still updated via RSS of any new content updates to the group 242.

Email threads include context in a difficult to read format. For example all past (related) messages are included in the body of an email. Chat has an advantage over email in this regard. Context in chat is easier to understand, sequential (as opposed to reversed order in an email), and not branched (email context is often fragmented). This context may be displayed regardless of the modality to which one subscribes. Specifically, RSS feeds and/or email digests may contain a small section of context prior to the new content. In each case, the contextual content may be differentiated from the new content with visual cues.

Chat conversations according to embodiments have advantages over other forms of communication. When representing chat conversations that take place within a real-time-group, there is a subset of participants that are 'active' during the conversation. Not all members of the real time group are necessarily participating in the conversation. The participant list may be rendered to the digest views in both RSS and email according to one embodiment. Information such as when the conversation started and who the participants were may be specifically included in the notification. If some participants join or leave the conversation mid-stream, that may be indicated the digest and/or historical record. For real-time chat users, metadata messages that are inserted between the chat messages to document the joining and leaving of participants are used. Similar messages may be used in the RSS or email digests according to other embodiments. According to further embodiments, each message digest may include a timestamp and author information. Furthermore, Of course, the functionalities discussed above may also be performed by other devices in the system such as multipurpose servers, dedicated servers, and comparable ones in a centralized or distributed fashion. The communication modes discussed above do not constitute a limitation on embodiments. Any communication modality may be employed in implementing a real-time directory group according to embodiments.

Participants in a multimodal conversation such as the one shown in diagram 200 may be part of the same network (e.g. an enterprise network), connected through different networks (e.g. in a federated environment), or communicate via a combination of secure and unsecure networks such as the Internet. Appropriate security measures such as personal identification numbers, passwords, and comparable ones may be employed to ensure privacy and security of the conversation in conjunction with the real-time group.

While email subscription is useful for consuming chat conversations in a real-time-group, it is also useful (when no other suitable modality exists) for publishing messages that others can consume in chat form. Specifically, a user can send a message via email, to be published via chat, to a real time group (also called email bridge). This is valuable when the nature of the message is short or informational, for immediate consumption, or otherwise inappropriate for email.

Figure 3:
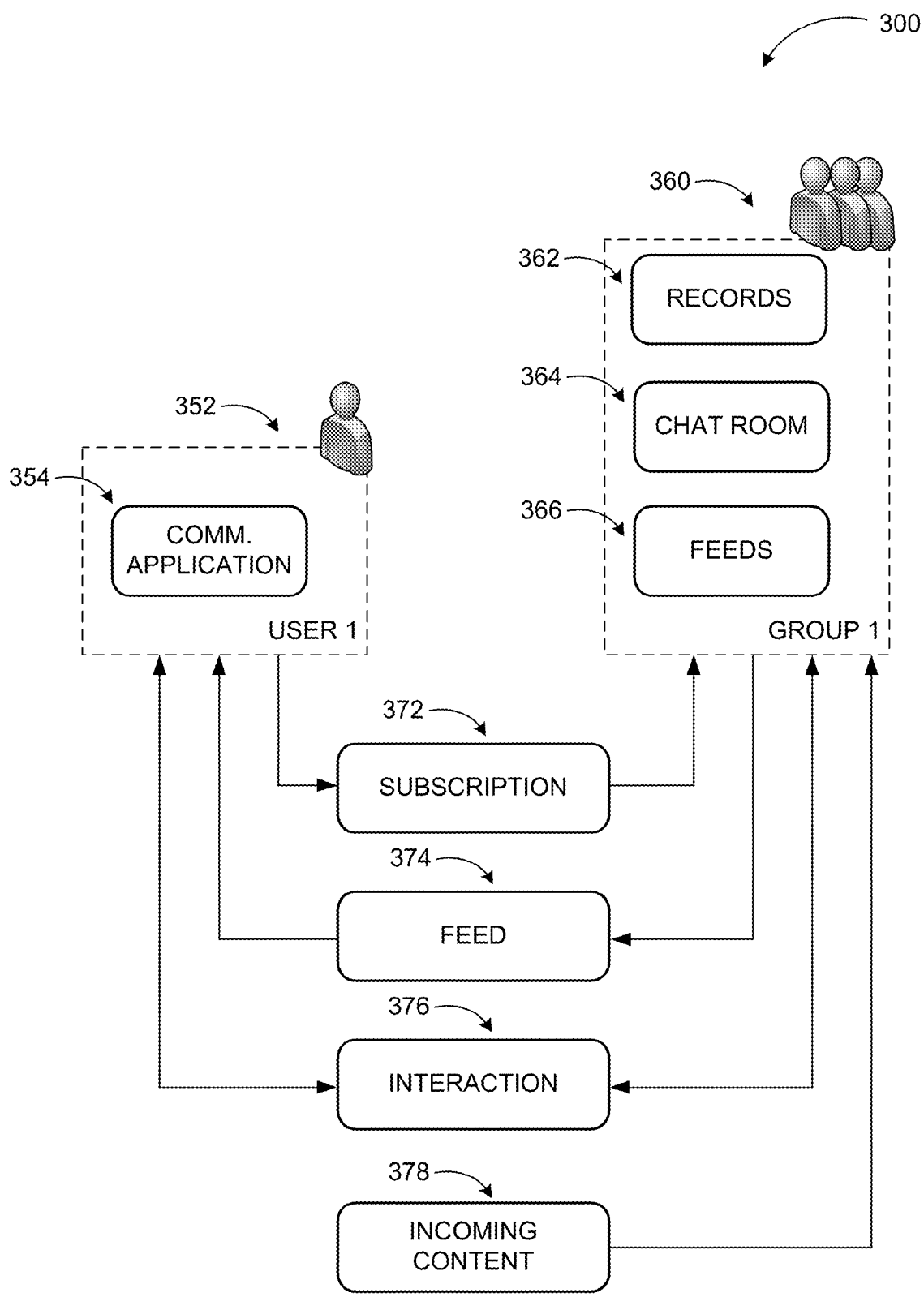
FIG. 3 illustrates major components and actions in an enhanced communication system for facilitating interaction with real-time directory groups according to embodiments.

FIG. 3 illustrates major components and actions in an enhanced communication system for facilitating interaction with real-time directory groups according to embodiments. User 1 (352) may be part of an enhanced communication system with a communication application 354 that enables the user to communicate with others via various communication modes.

As discussed previously, real-time directory group 360 may be created by a user of the communication system or by an administrator to enable subscribers to interact with each other in real time while reducing exchanged email traffic. Real-time group 360 includes a chat room 364 associated with it, one or more feeds 366 to notify subscribers about new content (378), and records 362 associated with ongoing and past conversations.

Interactions between user 1 and real-time group 1 begin with subscription of the user to the group (372), at which time the user may define their preferred method of notification, their preference (and/or capability) regarding participation in chat sessions (text, audio, video, application sharing, etc.). After the subscription, user 1 (352) may receive notification about new content via feed 374 or similar mechanism periodically or when new content is received.

User 1 may decide at any time to interact with the group (376) in other forms and join the chat room associated with the group. The chat session may include any of the modalities listed above, review of documents, and comparable interactions. A communication system according to embodiments may include multiple real-time directory groups and provide subscribers of such groups also aggregated notifications. For example, a user may subscribe to a technical assistance group and a design group, where the discussions may sometimes overlap. The group management server may provide the user with the ability to select notifications (e.g. feeds) from both groups to be aggregated.

The above discussed scenarios, example systems, conversation modalities, and configurations are for illustration purposes. Embodiments are not restricted to those examples. Other forms of notifications, configurations, communication modes, and scenarios may be used in implementing real-time directory groups in a similar manner using the principles described herein.

Figure 4:
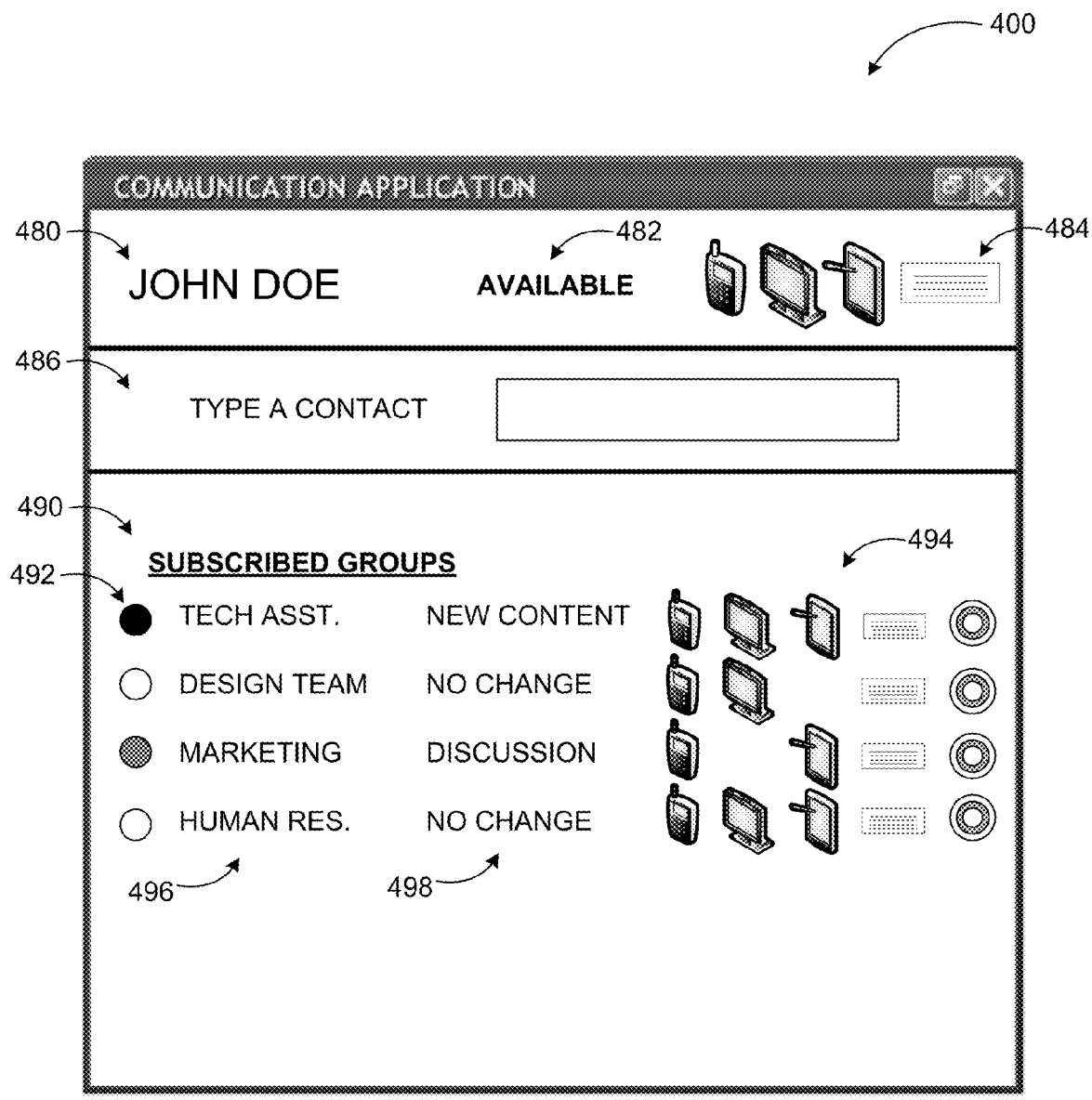
FIG. 4 is an example communication application user interface with real-time directory group interaction features in a system according to embodiments.

FIG. 4 is an example communication application user interface with real-time directory group interaction features in a system according to embodiments. User interfaces of communication applications facilitating multimodal communications may include a number of graphic and/or textual elements to provide users information and enable them to make selections. User interface 400 illustrates mainly example elements for interactions with real-time groups.

The example user interface may include the user's identification 480 and presence status 482, as well as available communication modalities 484 (e.g. audio, video, text messaging, and email). Another portion of the example user interface 400 includes an input box for the user to enter a contact such as the group chat room for initiating communication (486) (e.g. the subscriber decides to join the chat session upon reviewing the feed from the group). Another portion of the user interface may list the user's subscribed groups 490.

Each of the groups may be listed with their descriptor (496) and a current status of the group (498). For example, one group may be listed as having new content available, another as having on ongoing discussion, and two others having no change in their status. The status of the groups may also be indicated graphically using icons or other schemes (492). The user interface may also include graphical (or otherwise) indications of available communication modes for each of the groups such as audio, video, text messaging, email, feed, and similar ones.

In addition to the modalities discussed herein for RSS, email, and chat within a real-time-group, the interaction may also include a modality for shared content, via integration of hosted services. Using a hosted service, a group can have a team site for storing shared content which can be accessed by the application directly or indirectly through one of the previously named modalities. For example, user interface 400 may be employed to alert users to the existence of new shared content in the repository. Shared content may be posted directly to the shared site at the hosted service in a traditional manner.

In a system according to embodiments, other forms of uploading and accessing content may also be used. For example, shared content may be posted to a thread in chat. When this happens, the content is stored to the shared repository, and can be accessed there for future reference. The associated message, author, thread, and timestamp may be used to construct the metadata for this shared content file. According to another embodiment, shared content sent to the real-time-group via email may also be posted to the repository. Again, the message content, author, timestamp, and other metadata may be used to construct the file record.

A user interface for an enhanced communication application enabling interaction with real-time directory groups may include additional or fewer textual and graphical elements, and may employ various graphical, color, and other configuration schemes to display different functionalities. Interactions with real-time directory groups may also be accomplished through other types of user interfaces such as an email user interface, a text messaging application user interface, and others.

Figure 5:
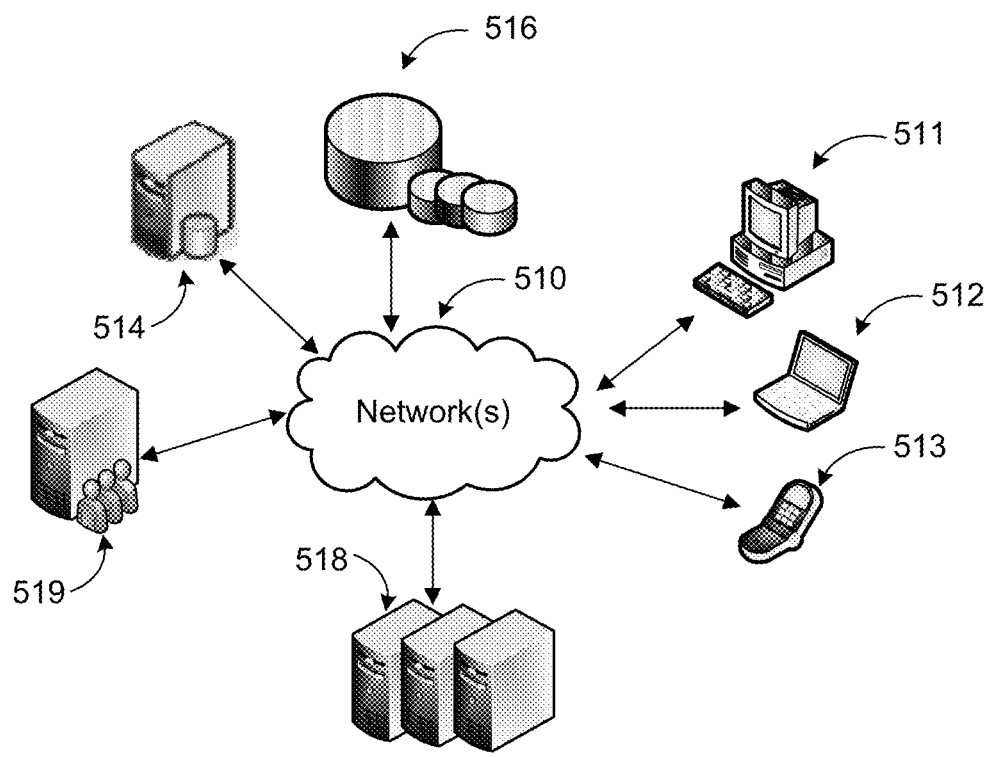
FIG. 5 is a networked environment, where a system according to embodiments may be implemented.

FIG. 5 is an example networked environment, where embodiments may be implemented. An enhanced communication system providing communication services including interactions with a real-time directory group may be implemented via software executed over one or more servers 518 such as a hosted service. The system may facilitate communications between client applications on individual computing devices such as a smart phone 513, a laptop computer 512, and desktop computer 511 ('client devices') through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 511-513 are used to facilitate communications through a variety of modes between subscribers of the communication system and interactions with real-time directory groups. One or more of the servers 518 or a separate group management server 519 may be tasked with managing group communications, distributing incoming content via feeds, enabling subscribers of the group to join chat sessions, access stored content and other records associated with the group. Information associated with subscribers and facilitating interactions with the group, as well as content and records associated with the real-time group, may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a communication system with real-time directory groups. Furthermore, the networked environments discussed in FIG. 5 are for illustration purposes only. Embodiments are not limited to the example applications, modules, or processes.

Figure 6:
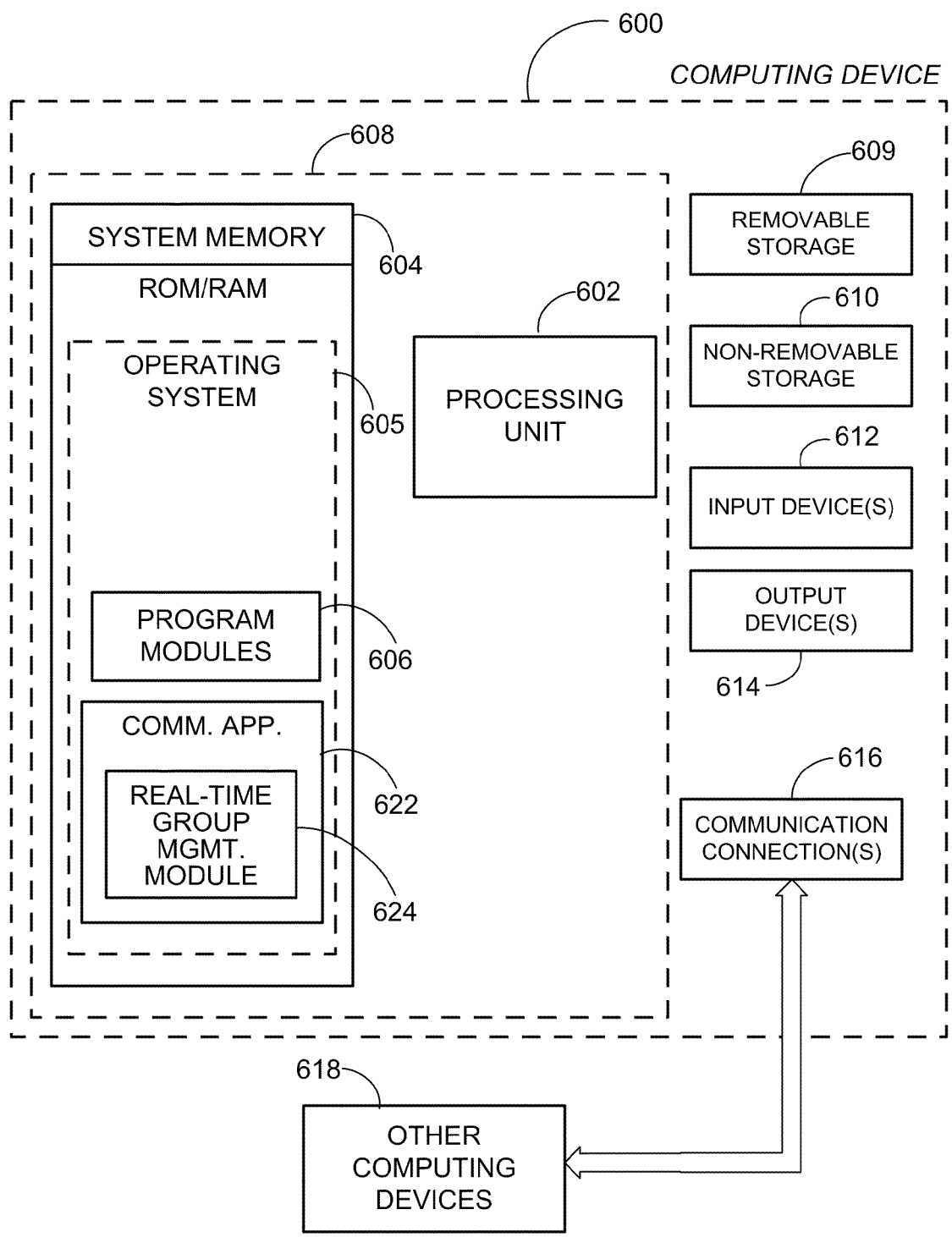
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server as part of an enhanced communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication service 622, and real-time group management module 624.

Communication service 622 may facilitate communication through various modalities between client applications, servers, and other devices. Real-time group management module 624 may enable subscribers to create such groups, manage incoming content, notify subscribers via feeds or other mechanisms, enable subscribers to interact with the group through chat sessions of various modalities, and perform similar tasks. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
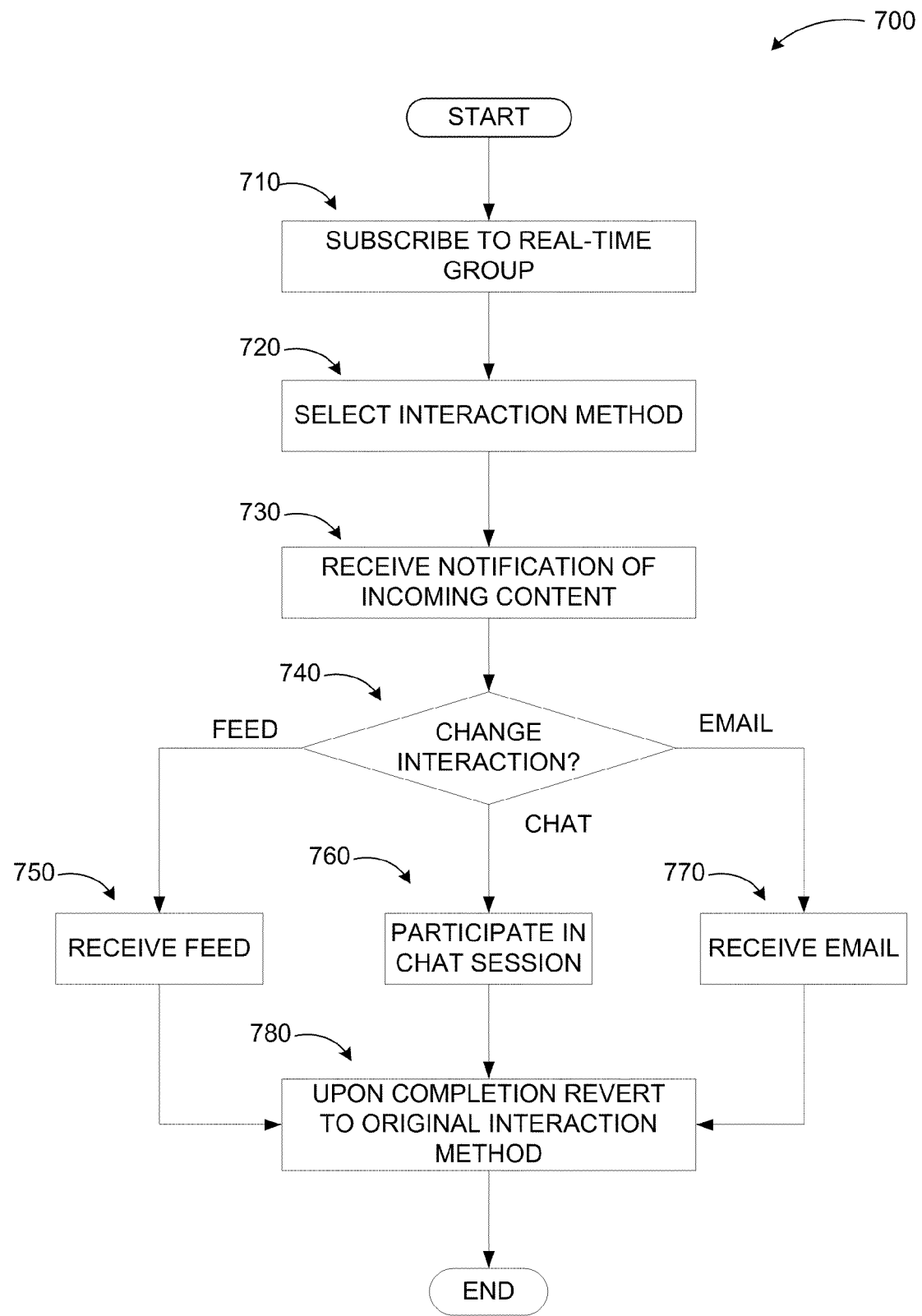
FIG. 7 illustrates a logic flow diagram for a process of interacting with a real-time directory group according to embodiments.

FIG. 7 illustrates a logic flow diagram for process 700 of interacting with a real-time directory group according to embodiments. Process 700 may be implemented as part of a communication system that facilitates multiple communication modes.

Process 700 begins with operation 710, where a user subscribes to a real-time group. This is followed by the user (now the subscriber) selecting a default interaction method with the group at operation 720. The default interaction method may include receiving feeds like RSS feeds, email notifications, or text message notifications. In case of email or text message notifications, the number and content of those may be optimized such that the subscriber does not get inundated with voluminous communications such as repeated responses between group members, and so on.

At operation 730, the subscriber receives notification of incoming content to the group via one of the methods described above. The notification may include information on the incoming content—a subject matter of the new content, a link to a document associated with the new content, reference information associated with the new content, and similar data—and additional data such as related conversations, records, available interaction modes, etc. The notification may be in form of a feed, an electronic mail message, an instant message, a SIP notification, a visual alert, an audio alert, and comparable alerts.

In response to the notification received at operation 730, the subscriber may decide whether to change his/her default interaction method at decision operation 740. If the subscriber decides to receive feeds, they continue to receive feeds associated with incoming content at operation 750. If they decide to participate in a live chat session, they can join a chat session at operation 760 employing text messaging, audio communication, video communication, application sharing, data sharing, or similar modes. The chat sessions may also start with one modality and escalate to another based on participant decisions. The subscriber may also decide to receive emails at decision operation 740, which results in emails associated with the incoming content being sent to the subscriber at operation 770.

When the conversation on the topic is completed or the subscriber decides to leave the conversation, they can revert to the original method of interaction with the group at operation 780. The user may also be provided information associated with an ongoing conversation based on a user request, a predefined period, or a completion of the ongoing conversation The operations included in process 700 are for illustration purposes. A communication service with real-time directory group capability may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating interactions with real-time directory groups, the method comprising:
   subscribing a user to a real-time directory group, wherein the group includes an associated chat room;
   determining the user's default notification means for new content, the default notification means comprising one of a feed, an electronic mail message, an instant message, a SIP notification, a visual alert, and an audio alert;
   receiving the new content for the group;
   notifying the user about the new content employing the user's default notification means such that voluminous communications from group members is avoided;
   in response to an active interaction mode change selection by the user, enabling the user to interact with the group via a communication session through the chat room;
   displaying a contextual history of the new content as history in the chat room;
   constructing a metadata to store the new content using at least one of: the electronic mail message, the instant message, an author, a thread, and a timestamp;
   storing the new content in a shared repository using the metadata to upload and access the new content; and
   publishing the new content within a chat form in the chat room through an email bridge in response to receiving the new content through another email message.

2. The method of claim 1, further comprising:
   in response to receiving an indication from the user, reverting the user back to a notification mode from the active interaction mode enabling the communication session through the chat room, wherein the user receives notifications via the default notification means if additional new content is received for the group.

3. The method of claim 1, wherein enabling the user to interact with the group includes enabling the user to participate in a conversation associated with the received new content employing at least one communication mode.

4. The method of claim 3, wherein the at least one communication mode includes one from the following: audio communication, video communication, an application sharing session, a data sharing session, a whiteboard sharing session, an electronic mail exchange, and an instant message session.

5. The method of claim 1, wherein the notification includes information associated with at least one from a set of: a subject matter of the new content, a link to a document associated with the new content, and reference information associated with the new content.

6. The method of claim 1, wherein the notification means includes one of: a feed, an electronic mail message, an instant message, a SIP notification, a visual alert, and an audio alert.

7. The method of claim 1, wherein the new content includes one of: a message, a document, an audio file, and a video file.

8. The method of claim 1, further comprising:
   providing the user access to at least one from a set of: stored documents, recordings, and links associated with current and past conversations based on received content for the group.

9. The method of claim 1, wherein enabling the user to interact with the group includes enabling the user to join a conversation associated with the received new content employing one communication mode and to escalate the conversation to at least one other communication mode.

10. The method of claim 1, further comprising:
    providing the user information associated with an ongoing conversation based on one of: a user request, a predefined period, and a completion of the ongoing conversation.

11. A communication system comprising:
    a computing device including a memory and a processor coupled to the memory, the processor executing a communication service facilitating interactions with real-time directory groups, wherein the computing device is configured to:
    manage a plurality of real-time directory groups based on common themes;
    employ security measures including an identification number and a password associated with each member of the real-time directory groups to ensure a privacy and a security of conversations associated with the real-time directory groups;
    in response to receiving a request, subscribe a user to one of the groups;
    determine the user's default notification means including one of: a feed, an electronic mail message, an instant message, a SIP notification, a visual alert, and an audio alert;
    in response to receiving new content associated with the user's group, notify the user about the new content providing at least one from a set of: a subject matter of the new content, a link to a document associated with the new content, and reference information associated with the new content such that voluminous communications from group members is avoided;

display a small section of a sequential context associated with the user's group prior to the new content while differentiating the sequential context from the new content with visual cues;

include information associated with one of the conversations in the notification including at least one from a set of:
- a start time of the conversation, and
- participant information including at least one from a set of: joining participants and leaving participants; and in response to receiving an indication from the user, enable the user to interact with the group by joining the conversation with at least one communication mode through a chat room associated with the group.

12. The system of claim 11, further comprising:
another computing device executing a client application configured to:
present the notification to the user employing at least one from a set of: a textual scheme, a graphic scheme, and a color scheme; and
enable the user to establish multimodal communications with the user's group.

13. The system of claim 11, wherein the computing device is further configured to:
enable the user to create a new real-time directory group based on a common theme; and
invite other users to join the newly created group.

14. The system of claim 11, wherein the computing device is one of: a dedicated server and a multipurpose server.

15. The system of claim 11, wherein the computing device is further configured to:
enable the user to subscribe to another one of the plurality of groups;
aggregate notifications for both groups; and
provide the user the aggregated notifications.

16. A computer-readable memory device with instructions stored thereon for facilitating interactions with real-time directory groups, the instructions comprising:
in response to receiving a request, subscribing a user to a real-time directory group;
employing security measures including an identification number and a password associated with each member of the real-time directory group to ensure a privacy and a security of conversations associated with the real-time directory group;
in response to receiving new content addressed to the user's group, updating a feed provided to the user such that voluminous communications from group members is avoided, wherein the feed includes at least one from a set of: a subject matter of the new content, a link to a document associated with the new content, and reference information associated with the new content, the new content including one of: a message, a document, an audio file, and a video file;
displaying a small section of a sequential context associated with the user's group prior to the new content while differentiating the sequential context from the new content with visual cues;
including information associated with one of the conversations in the feed including at least one from a set of:
a start time of the conversation, and
participant information including at least one from a set of: joining participants and leaving participants;
in response to an interaction mode change selection by the user, enabling the user to join the conversation through a chat room associated with the group;
enabling the user to subscribe to a plurality of groups;
providing an aggregated feed to the user that includes content information associated with the subscribed groups;
constructing a metadata to store the new content using at least one of: the message, an author, a thread, and a timestamp;
storing the new content in a shared repository using the metadata to upload and access the new content;
publishing the new content within a chat form in the chat room through an email bridge in response to receiving the new content through an email message; and
upon the user's departure from the conversation, reverting the user back to a notification mode from an active interaction mode and continuing to monitor content addressed to the group such that the feed for the user is updated again if additional new content is received.

17. The computer-readable memory device of claim 16, wherein the user is enabled to join the conversation by selecting one of: a conversation identifier, a group Universal Resource Identifier (URI), and a feed URI.

18. The computer-readable memory device of claim 16, wherein the instructions further comprise:
providing a user interface to the user that includes identification, content status, and conversation capabilities of the subscribed groups employing at least one from a set of a textual scheme, a graphic scheme, and a color scheme such that the user is enabled to interact with any one of the subscribed groups through the user interface.

19. The computer-readable memory device of claim 16, wherein real-time directory groups are managed by one of: a server in a centralized fashion and a group of servers and clients in a distributed fashion.

* * * * *